(12) United States Patent
Niihata et al.

(10) Patent No.: US 11,978,349 B2
(45) Date of Patent: May 7, 2024

(54) CONTROL DEVICE, PROGRAM, AND CONTROL METHOD

(71) Applicant: NTT DOCOMO, INC., Tokyo (JP)

(72) Inventors: Kaori Niihata, Tokyo (JP); Tadao Takami, Tokyo (JP); Koji Ishii, Tokyo (JP); Hiroshi Kawakami, Tokyo (JP); Yuichiro Segawa, Tokyo (JP); Yasuhiro Kitamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 324 days.

(21) Appl. No.: 17/433,394

(22) PCT Filed: Jan. 24, 2020

(86) PCT No.: PCT/JP2020/002459
§ 371 (c)(1),
(2) Date: Aug. 24, 2021

(87) PCT Pub. No.: WO2020/230370
PCT Pub. Date: Nov. 19, 2020

(65) Prior Publication Data
US 2022/0148443 A1    May 12, 2022

(30) Foreign Application Priority Data
May 10, 2019    (JP) ................................ 2019-089812

(51) Int. Cl.
*G08G 5/00*    (2006.01)
*H04W 40/10*    (2009.01)
(Continued)

(52) U.S. Cl.
CPC .......... *G08G 5/0043* (2013.01); *H04W 40/10* (2013.01); *H04W 40/12* (2013.01);
(Continued)

(58) Field of Classification Search
CPC ... H04W 84/06; G08G 5/0056; G08G 5/0069; H04B 7/18504
See application file for complete search history.

(56) References Cited

U.S. PATENT DOCUMENTS

2014/0293852 A1    10/2014    Watanabe
2017/0069214 A1*    3/2017    Dupray ................ G08G 5/0008

FOREIGN PATENT DOCUMENTS

JP    2014-204194 A    10/2014

OTHER PUBLICATIONS

International Search Report issued in corresponding PCT Application No. PCT/JP2020/002459, dated Mar. 24, 2020.

* cited by examiner

*Primary Examiner* — Kevin Kim
(74) *Attorney, Agent, or Firm* — Dilworth IP, LLC

(57) ABSTRACT

A setting unit sets the operating mode of an aerial vehicle to a first operating mode that transmits, data generated by a host aerial vehicle and data received from another aerial vehicle to a processing device, or a second operating mode that transmits data generated by a host aerial vehicle to another aerial vehicle. At this time, setting unit sets the operating modes of each of a plurality of aerial vehicles using a setting method corresponding to the attributes of an airspace in which aerial vehicle flies, from among a plurality of setting methods that set the operating mode of aerial vehicle. The attributes of an airspace include attributes determined in accordance with a degree of importance pertaining to the process of transmitting data from aerial vehicle to a server device and/or attributes determined in accordance with the extent to which processes are distributed among a plurality of aerial vehicles.

8 Claims, 2 Drawing Sheets

(51) Int. Cl.
    *H04W 40/12*    (2009.01)
    *H04W 84/06*    (2009.01)
    *G05D 1/00*    (2006.01)
    *H04W 88/06*    (2009.01)
(52) U.S. Cl.
    CPC ............. *G05D 1/101* (2013.01); *H04W 84/06* (2013.01); *H04W 88/06* (2013.01)

CONTROL DEVICE, PROGRAM, AND CONTROL METHOD

TECHNICAL FIELD

The present invention pertains to a communication technique for an aerial vehicle.

BACKGROUND

Use of unmanned aerial vehicles referred to as drones is becoming widespread. When a plurality of such aerial vehicles fly in a group, generally one of the plurality of aerial vehicles serves as a main unit, collects data from other aerial vehicles and transmits the data to the ground. For example, Japanese Patent Application No. JP2014-204194 discloses an arrangement in which a main unit is selected from among a plurality of terminal devices on the basis of information such as reception quality, remaining battery power, or the like, and the terminal device selected as the main unit brings together data collected from other terminal devices and transmits the data to a relay station.

In the configuration disclosed in Japanese Patent Application No. JP2014-204194, for an aerial vehicle that is used on the ground and does not fly through the air a terminal device is not mounted thereto.

SUMMARY OF INVENTION

A purpose of the present invention is to appropriately control the operating mode of each aerial vehicle, when any of a plurality of aerial vehicles collects data from another aerial vehicle and transmits the data.

The present invention provides a control device comprising: a setting unit configured to set an operating mode of an aerial vehicle to a first operating mode or a second operating mode, the aerial vehicle comprising a first wireless communication unit configured to perform wireless communication via a communication network and a second wireless communication unit configured to perform wireless communication without use of the communication network, the first operating mode being an operating mode in which the aerial vehicle sends data generated in the aerial vehicle and data received from another aerial vehicle by use of the second wireless communication unit to a data processing device by use of the first wireless communication unit, the second operating mode being an operating mode in which the aerial vehicle sends, by use of the second wireless communication unit, data generated in the aerial vehicle to another aerial vehicle that is operating in the first operating mode; and attribute acquisition unit configured to acquire attributes of each of airspaces, wherein the setting unit is configured to set each of operating modes of aerial vehicles to the first operating mode or the second operating mode in accordance with one of setting methods that corresponds to an attribute of an airspace in which the aerial vehicles are flying.

The attributes may be classified in accordance with an importance of a process in which an aerial vehicle sends data to the processing device.

The attributes may be classified in accordance with an extent of distribution of communication-related processing among aerial vehicles.

The attributes may comprise a first attribute and a second attribute. A process of sending data to the processing device may be important and an extent of distribution of processing among aerial vehicles may be smaller in an airspace having the first attribute than that in an airspace having the second attribute. The setting unit may be configured to set, in the airspace having the first attribute, each of operating modes of aerial vehicles in accordance with a setting method whereby one of the aerial vehicles sends data to the processing device earlier than in the airspace having the second attribute. The setting unit may be configured to set, in the airspace having the second attribute, each of operating modes of aerial vehicles in accordance with a setting method whereby an extent of distribution of processing among the aerial vehicles in the airspace having the second attribute is larger than that in the airspace having the first attribute.

The setting methods may comprise: a first setting method whereby an aerial vehicle operating in the first operating mode is not caused to change its operating mode regardless of whether the aerial vehicle is suited to operating in the first operating mode; a second setting method whereby before an aerial vehicle operating in the first operating mode is caused to change its operating mode to the second operating mode, a determination is made whether the aerial vehicle is suited to operating in the first operating mode within a predetermined time period, and the aerial vehicle is caused to change its operating mode based on the determination; and a third setting method whereby when a first aerial vehicle of aerial vehicles, operating in the first operating mode, is not suited to operating in the first operating mode, and a second aerial vehicle of the aerial vehicles is not suited to operating in the first operating mode, the first aerial vehicle is not caused to change its operating mode.

The airspaces may comprise airspaces that differ spatially or airspaces that are spatially identical and differ temporally.

The present invention also provides a program for causing a computer to function as: an attribute acquisition unit configured to acquire attributes of each of airspaces; and a setting unit configured to set an operating mode of an aerial vehicle to a first operating mode or a second operating mode, the aerial vehicle comprising a first wireless communication unit configured to perform wireless communication via a communication network and a second wireless communication unit configured to perform wireless communication without use of the communication network, the first operating mode being an operating mode in which the aerial vehicle sends data generated in the aerial vehicle and data received from another aerial vehicle by use of the second wireless communication unit to a data processing device by use of the first wireless communication unit, the second operating mode being an operating mode in which the aerial vehicle sends, by use of the second wireless communication unit, data generated in the aerial vehicle to another aerial vehicle that is operating in the first operating mode, wherein the setting unit is configured to set each of operating modes of aerial vehicles to the first operating mode or the second operating mode in accordance with one of setting methods that corresponds to an attribute of an airspace in which the aerial vehicles are flying.

The present invention also provides a control method comprising: acquiring attributes of each of airspaces; and setting each of operating modes of aerial vehicles to a first operating mode or a second operating mode in accordance with a setting method that corresponds to an attribute of an airspace in which the aerial vehicles are flying, wherein: each of the aerial vehicles comprises a first wireless communication unit configured to perform wireless communication via a communication network and a second wireless communication unit configured to perform wireless communication without use of the communication network; the first operating mode is an operating mode in which an aerial vehicle sends data generated in the aerial vehicle and data received from another aerial vehicle by use of a second wireless communication unit of the aerial vehicle to a data processing device by use of a first wireless communication unit of the aerial vehicle; and the second operating mode is an operating mode in which an aerial vehicle sends, by use of a second wireless communication unit of the aerial vehicle, data generated in the aerial vehicle to another aerial vehicle that is operating in the first operating mode.

According to the present invention, the operating mode of each aerial vehicle can be appropriately controlled when any of a plurality of aerial vehicles collects data from another aerial vehicle and transmits the data.

DETAILED DESCRIPTION

Configuration

Figure 1:
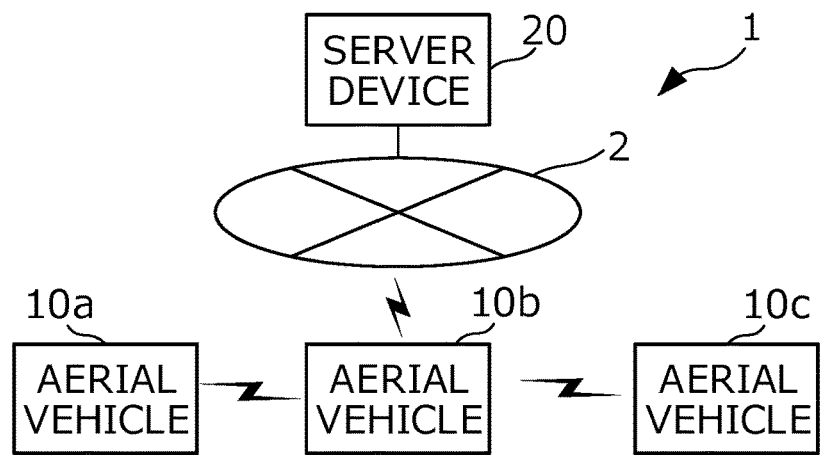
FIG. 1 is a drawing illustrating one example of the configuration of a flight control system in accordance with the present invention.

FIG. 1 is a drawing illustrating one example of the configuration of a flight control system 1. Flight control system 1 comprises unmanned aerial vehicles 10a, 10b, and 10c referred to as drones, for example, a server device 20 that serves as a processing device that processes data acquired from aerial vehicles 10a, 10b, and 10c, and a communication network 2 that communicably connects the aerial vehicles and server device 20. Communication network 2 is a wireless communication network such as long-term evolution (LTE). A plurality of aerial vehicles 10 exist. FIG. 1 illustrates three aerial vehicles 10a, 10b, and 10c, but the number of aerial vehicles may be fewer or more. Aerial vehicle 10 may be an aerial vehicle that flies in accordance with the operation by an operator of a maneuvering terminal (not illustrated) (that is, manual flight), an aerial vehicle that flies autonomously under the management of a flight management device (not illustrated) (that is, automatic flight), or an aerial vehicle that adopts both the manual flight and automatic flight. In the following explanation, aerial vehicle 10 refers to each of aerial vehicles 10.

Aerial vehicles 10a, 10b, and 10c fly in a group while maintaining a distance from one another that is within a threshold value. At this time, any of the plurality of aerial vehicles 10 collects data from another aerial vehicle 10 and transmits the data to server device 20. Server device 20 processes the data received from aerial vehicle 10.

Figure 2:
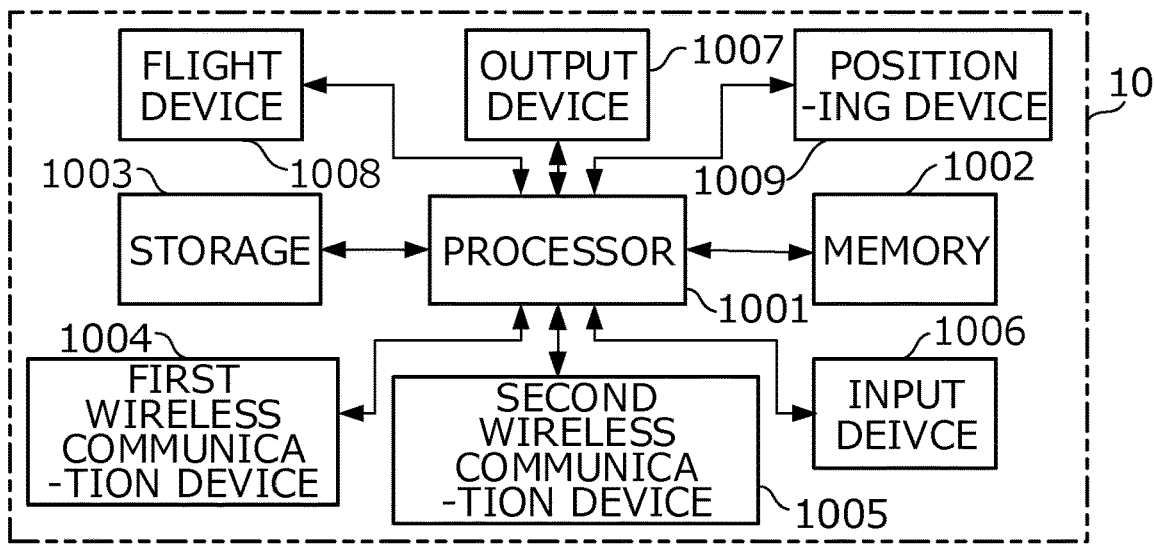
FIG. 2 is a drawing illustrating the hardware configuration of an aerial vehicle in accordance with the present invention.

FIG. 2 is a drawing illustrating the hardware configuration of aerial vehicle 10. Aerial vehicle 10 is physically configured as a computer device including a processor 1001, a memory 1002, storage 1003, a first wireless communication device 1004, a second wireless communication device 1005, an input device 1006, an output device 1007, a flight device 1008, a positioning device 1009, buses that connect the aforementioned devices, a battery (not illustrated), and the like. Each of the devices is operated by power supplied from the battery (not illustrated). In the following explanation, the term "device" may be replaced with circuit, unit, or the like. The hardware configuration of aerial vehicle 10 may be configured so as to include one or a plurality of each of the illustrated devices, or configured so as not to include some of the devices.

Each of the functions in aerial vehicle 10 is realized by means of processor 1001 performing an operation by having hardware such as processor 1001 or memory 1002 read predetermined software (program) and controlling communication by communication device 1004, controlling the reading and/or writing of data from/to memory 1002 and storage 1003, or the like.

Processor 1001 controls the entire computer by operating an operating system, for example. Processor 1001 may comprise a central processing unit (CPU) including an interface with peripheral devices, a control device, an operation device, a register, and the like. Moreover, a baseband signal processing unit, a call processing unit, or the like may be realized by processor 1001, for example.

Processor 1001 reads a program (program code), a software module, data, and the like from storage 1003 and/or communication device 1004 to memory 1002, and executes each type of processing in compliance therewith. For the program, a program that causes a computer to execute at least some of the following operations is used. The function block of aerial vehicle 10 may be realized by a control program that is stored in memory 1002 and operated in processor 1001. Each type of processing may be executed by one processor 1001, or executed simultaneously or consecutively by two or more processors 1001. Processor 1001 may be mounted on one or more chip. Moreover, a program may be transmitted from communication network 2 to aerial vehicle 10 via an electronic communication circuit.

Memory 1002 is a recording medium capable of being read by a computer, and may comprise one or more of a read-only memory (ROM), an erasable programmable ROM (EPROM), an electrically erasable programmable ROM (EEPROM), a random access memory (RAM), and the like, for example. Memory 1002 may be referred to as a register, a cache, a main memory (main storage device), or the like. Memory 1002 is capable of storing a program (program code), a software module, or the like, which can be executed to realize the method pertaining to the present embodiment.

Storage 1003 is a recording medium capable of being read by a computer, and may comprise one or more of an optical disk such as a compact disc ROM (CD-ROM), a hard disk drive, a flexible disk, a magneto-optical disk (for example, a compact disk, a digital multipurpose disk, a Blu-ray (registered trademark) disk), a smart card, a flash memory (for example, a card, a stick, a key drive), a Floppy (registered trademark) disk, a magnetic strip, and the like, for example. Storage 1003 may be referred to as an auxiliary storage device. Storage 1003 stores information pertaining to the attributes of aerial vehicle 10, such as identification information of aerial vehicle 10, model information, flight schedule identification information, and the like, for example.

First wireless communication device 1004 is hardware (transmission/receiving device) for communicating with a remote ground via communication network 2, and includes an antenna, a communication module, or the like that complies with LTE, for example. First wireless communication device 1004 is mainly used for aerial vehicle 10 to communicate with server device 20.

Second wireless communication device 1005 is hardware (transmission/receiving device) for wirelessly communicating at a relatively short distance without the use of communication network 2, and includes an antenna, a communication module, or the like that complies with a wireless local area network (LAN) and/or Bluetooth (registered trademark), for example. Second wireless communication device 1005 is mainly used for aerial vehicle 10 to communicate with another aerial vehicle 10.

Input device 1006 is a device (for example, a key, a microphone, a switch, a button, a sensor, a camera, etc.) that accepts external input. For example, if input device 1006 is a camera, input device 1006 generates imaging data showing a captured image. Moreover, if, for example, input device 1006 is a sensor, input device 1006 generates sensing data showing the results of sensing. Output device 1007 is a device (for example, a display, a speaker, an LED lamp, etc.) that outputs to the exterior.

Flight device 1008 is a mechanism for causing aerial vehicle 10 to fly in the air, and includes a propeller, and a motor and a drive mechanism for driving the propeller, for example. Furthermore, flight device 1008 includes, for example, a group of sensors including a rotation speed sensor that detects the rotation speed of the motor, a sensor that detects a value pertaining to the input/output of current, voltage, or the like (for example, a remaining power sensor of a battery), gyro sensor, an acceleration sensor, a pressure (altitude) sensor, a magnetic (compass) sensor, an ultrasonic sensor, and the like. The flight direction and flight speed of aerial vehicle 10 are specified according to the detection results of the aforementioned sensors.

Positioning device 1009 measures the three-dimensional position of aerial vehicle 10. Positioning device 1009 is a global positioning system (GPS) receiving device, for example, and measures the position of aerial vehicle 10 on the basis of GPS signals received from a plurality of satellites. The position of aerial vehicle 10 is specified according to the positioning results of the positioning device.

Each of the devices such as processor 1001 and memory 1002 are connected by a bus for communicating information. The bus may comprise a single bus, or buses that differ for each connection between devices.

Aerial vehicle 10 may comprise hardware such as a microprocessor, a digital signal processor (DSP), an application specific integrated circuit (ASIC), a programmable logic device (PLD), and a field programmable gate array (FPGA), and some or all of each functional block may be realized by the aforementioned hardware. For example, processor 1001 may be mounted using one or more of the aforementioned hardware.

Figure 3:
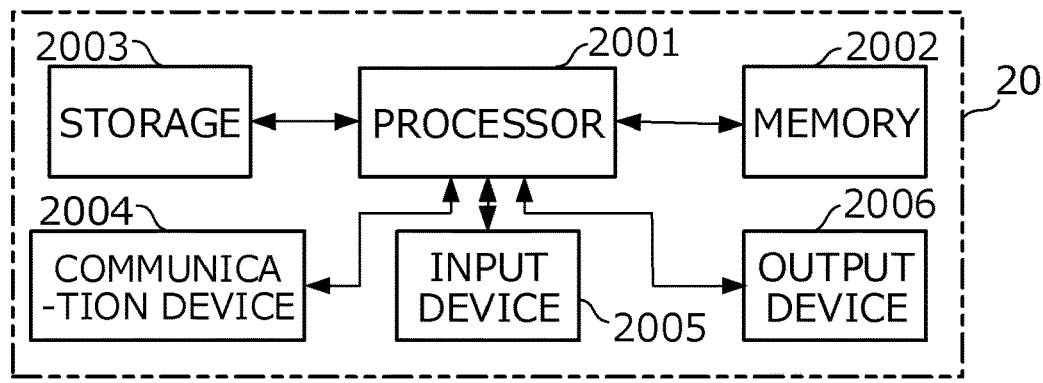
FIG. 3 is a drawing illustrating the hardware configuration of a server device in accordance with the present invention.

FIG. 3 is a drawing illustrating the hardware configuration of a server device 20. Server device 20 is physically configured as a computer device including a processor 2001, a memory 2002, a storage 2003, a communication device 2004, an input device 2005, an output device 2006, buses that connect the aforementioned devices, and the like. Each of the functions in server device 20 is realized by means of processor 2001 performing an operation by having hardware such as processor 2001 or memory 2002 read predetermined software (program) and controlling communication by communication device 2004, controlling the reading and/or writing of data from/to memory 2002 and storage 2003, or the like. In terms of hardware, processor 2001, memory 2002, storage 2003, input device 2005, output device 2006, and the buses that connect the devices are similar to processor 1001, memory 1002, storage 1003, input device 1006, output device 1007, and the buses that connects the devices, explained in relation to aerial vehicle 10, and thus explanation thereof is omitted. Communication device 1004 is hardware (transmission/receiving device) for performing communication via communication network 2, and is also referred to as a communication network device, a communication network controller, a communication network card, a communication module, or the like, for example.

Figure 4:
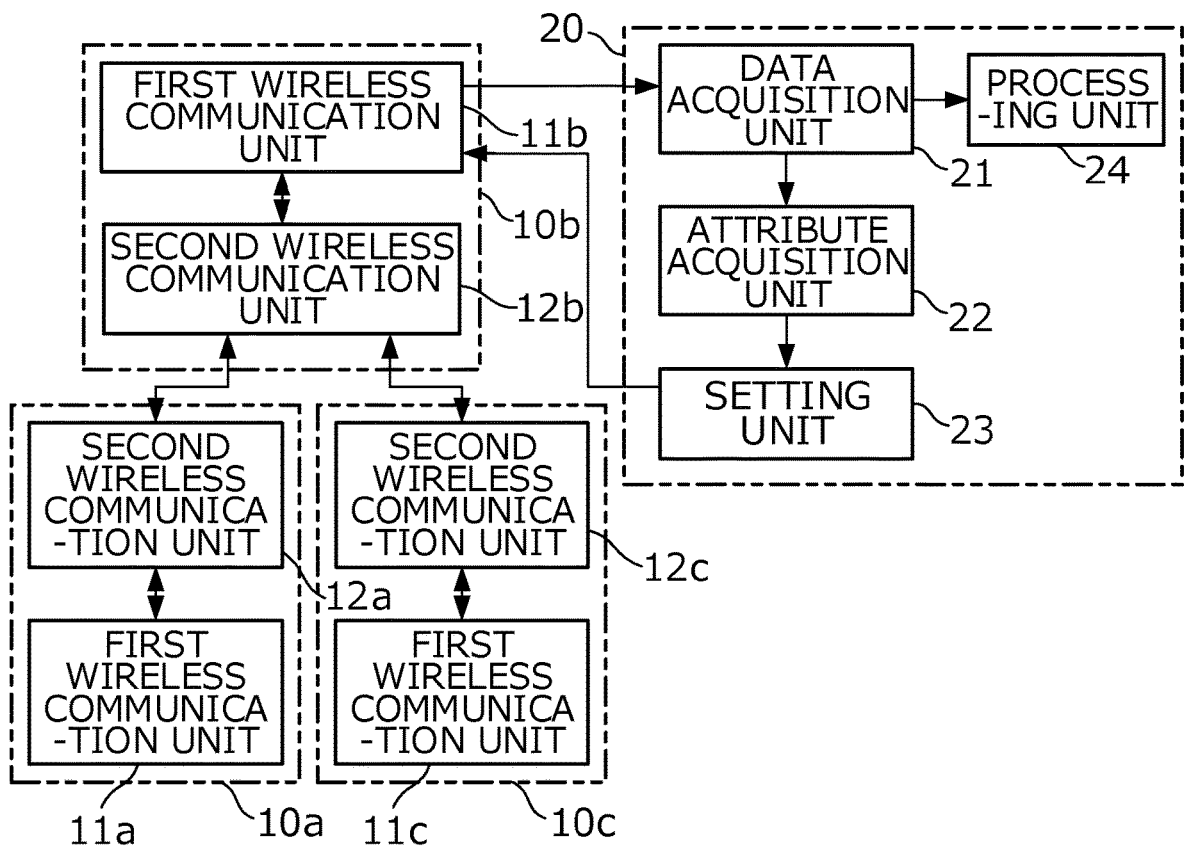
FIG. 4 is a drawing illustrating one example of the functional configuration of a flight control system in accordance with the present invention.

FIG. 4 is a drawing illustrating one example of the functional configuration of a flight control system 1. In Aerial vehicle 10b, first wireless communication unit 11b has a function that is realized by first wireless communication device 1004 illustrated in FIG. 2, and performs wireless communication via communication network 2. Second wireless communication unit 12b has a function that is realized by second wireless communication device 1005 illustrated in FIG. 2, and performs wireless communication without the use of communication network 2. Similarly, in aerial vehicles 10a and 10c, first wireless communication units 11a and 11c perform wireless communication via communication network 2, and second wireless communication units 12a and 12c perform wireless communication without the use of wireless network 2. In the following explanation, first wireless communication unit 11 or second wireless communication unit 12 refers to a first wireless communication unit or second wireless communication unit that has the same configuration in all of aerial vehicles 10.

The example in FIG. 4 exemplifies a case in which aerial vehicle 10b collects data from other aerial vehicles 10a and 10c and transmits the data to server device 20. Here, two operating modes exist for each of aerial vehicles 10. The first operating mode (hereafter referred to as main unit mode) is an operating mode that transmits, to server device 20 using first wireless communication unit 11, data generated in host aerial vehicle 10 and data received by second wireless communication unit 12 from another aerial vehicle 10 (aerial vehicle 10 operating in auxiliary unit mode). The second operating mode (hereafter referred to as auxiliary unit mode) is an operating mode that transmits, to another aerial vehicle 10 (aerial vehicle 10 operating in main unit mode) using second wireless communication unit 12, data generated in host aerial vehicle 10. That is, in the example in FIG. 4, aerial vehicle 10b is operating in main unit mode and aerial vehicles 10a and 10c are operating in auxiliary unit mode. Hereafter, aerial vehicles operating in main unit mode are referred to as main units, and aerial vehicles operating in auxiliary unit mode are referred to as auxiliary units. A plurality of auxiliary units communicate with one main unit via second wireless communication unit 12. Moreover, setting a given aerial vehicle from main unit mode to auxiliary unit mode and simultaneously setting another aerial vehicle from auxiliary unit mode to main unit mode is referred to as switching of main unit.

References when setting to main unit mode/auxiliary unit mode are as follows.

(A) Setting Using Communication Quality a Reference

From among a plurality of aerial vehicles 10, aerial vehicles 10 having a communication quality that equal to or greater than a threshold value when performing communication via communication network 2 are set as main units. In such a case, a configuration may be adopted, wherein, if it is determined that a main device is switched from a given first aerial vehicle 10 to another second aerial vehicle 10 on the basis of communication quality, first aerial vehicle 10 temporarily buffers data received from aerial vehicle 10 that is an auxiliary device and to be transmitted to server device 20 in memory 1002 for a predetermined period prior to the switching, and if communication quality recovers in first aerial vehicle 10 before the predetermined period has elapsed, transmits the buffered data to server device 20. However, when the abovementioned predetermined period has elapsed, or if the amount of buffered data exceeds a predetermined ratio with respect to the maximum buffering storage capacity, the main unit is switched from first aerial vehicle 10 to second aerial vehicle 10.

Moreover, a configuration may be adopted, wherein, if it has been determined that the main unit is to be switched from a given first aerial vehicle 10 to another second aerial vehicle 10 on the basis of communication quality, only specific data from among data to be transmitted to server device 20 is transmitted from first aerial vehicle 10 prior to the switching. In such a case, the remaining non-transmitted data is transmitted from first aerial vehicle 10 to server device 20 after communication quality has recovered in first aerial vehicle 10. An example of specific data is data corresponding to important frame information on the basis of frame information (I/P/B frame) in video image encoding technology such as MPEG, for example. However, when a predetermined period has elapsed from the abovementioned time of determination, the main unit is switched from first aerial vehicle 10 to second aerial vehicle 10.

During the switching of the main unit, the following data exchange is performed between the main unit prior to switching (first aerial vehicle) and the main unit after switching (second aerial vehicle). Specifically, collected data to be transmitted by first aerial vehicle 10 from other aerial vehicles 10 (including second aerial vehicle 10) to server device 20 before the main unit is switched from first aerial vehicle 10 to second aerial vehicle 10, is transmitted from first aerial vehicle 10 to second aerial vehicle 10 after the main unit is switched from first aerial vehicle 10 to second aerial vehicle 10. Second aerial vehicle 10 transmits data received from the first aerial vehicle to server device 20. Moreover, second aerial vehicle 10 transmits, to server device 20, data collected from another aerial vehicle 10 (includes first aerial vehicle 10) after the switching of the main unit. Accordingly, deletion of data to be transmitted to server device 20 before/after the switching of the main unit is avoided.

(B) Setting Using Remaining Power as a Reference

From among a plurality of aerial vehicles 10, aerial vehicles 10 having a remaining battery power that is equal to or greater than a threshold value are set as main units. When the main unit is switched, an auxiliary unit holds data for a fixed period even after the data is transmitted to the main unit so that data transmitted from an auxiliary unit reaches server device 20 without the loss of data, and when a main unit is newly set, the held data is retransmitted to the new main unit.

In server device 20, data acquisition unit 21 acquires data transmitted from first wireless communication unit 11b of aerial vehicle 10b. This data includes, for example, identification information of aerial vehicle 10b, information indicating the flight status, including the position (including latitude, longitude, and altitude), flight direction, and flight speed of aerial vehicle 10b, information indicating data generated in aerial vehicle 10b (the abovementioned imaging data or sensing data), and communication quality and/or remaining battery power of first wireless communication unit 11b in aerial vehicle 10b, and information acquired by aerial vehicle 10b from other aerial vehicles 10a and 10c. The information acquired by aerial vehicle 10b from other aerial vehicles 10a and 10c includes, for example, identification information of aerial vehicles 10a and 10c, information indicating the flight status, including the position (including latitude, longitude, and altitude), flight direction, and flight speed of aerial vehicles 10a and 10c, information indicating data generated in aerial vehicles 10a and 10c (the abovementioned imaging data or sensing data), and communication quality and/or remaining battery power of first wireless communication units 11a and 11c in aerial vehicles 10a and 10c.

In server device 20, attribute acquisition unit 22 acquires the attributes of each airspace. Here, an airspace is all of the space eligible for aerial vehicle 10 to fly through divided according to predetermined rules. The airspace includes an airspace that differs spatially, or an airspace that is constant spatially but differs temporally. In the present embodiment, the three attributes "normal", "quasi-monitored", and "monitored" are used as the attributes of an airspace. The following is an explanation of the attributes "normal", "quasi-monitored", and "monitored".

(A) Normal Airspace

In this airspace, stable operation of the entire system is prioritized. Therefore, it is desirable that processes pertaining to communication are distributed as much as possible among a plurality of aerial vehicles 10, that is, increasing the extent of process distribution. Specifically, simultaneous operation of all aerial vehicles 10 is enabled until immediately prior to the time at which the remaining power reaches zero, by switching the main unit so that the remaining battery power of each aerial vehicle 10 is as equal as possible. Therefore, in a normal airspace, setting of main unit mode/auxiliary unit mode is performed using the remaining power of each aerial vehicle 10 as a reference. Moreover, even if, for instance, a situation in which the communication quality of the main unit deteriorates and switching of the main unit is required (a situation in which operation in main unit mode is not suitable) occurs, the main unit performs temporary buffering of data as described above, and switching of the main unit is not executed. That is, the setting method of the main unit mode/auxiliary unit mode in a normal airspace is a first setting method of not modifying the operating mode of aerial vehicle 10 regardless of whether aerial vehicle 10 operating in main unit mode is suited to being operated in main unit mode.

(B) Quasi-Monitored Airspace

In this airspace, transmission of data from a main unit to server device 20 is prioritized, rather than the entire system being operated in a stable manner. Therefore, in a quasi-monitored airspace, if, for instance, a situation in which the communication quality of the main unit deteriorates and switching of the main unit is required (that is, a situation in which operation in main unit mode is not suitable) occurs, whether or not the communication quality will recover is first determined, and if recovery is likely prior to the elapse of a given period as a result of the determination, temporary buffering of data such as that described above is performed. Meanwhile, if recovery is not likely prior to the elapse of a given period, the main unit is switched to an aerial vehicle having good communication quality. Estimation of communication quality is realized by holding, in advance, a map that includes a prediction value of the communication quality of each airspace, and predicting the communication quality in a future position of each aerial vehicle 10, using the map and moving direction of a group of aerial vehicles 10. Accordingly, the setting method of main unit mode/auxiliary unit mode in a quasi-monitored airspace is a second setting method of determining whether or not an aerial vehicle 10 is suited to being operated in main unit mode within a predetermined period prior to modifying the operating mode of aerial vehicle 10 that is operating in main unit mode to auxiliary unit mode, and setting the operating mode of aerial vehicle 10 in accordance with the results of the determination.

(C) Monitored Airspace

In this airspace, data transmission from the main unit to server device 20 is prioritized. Therefore, in a monitored airspace, if, for instance, a situation in which the communication quality of the main unit deteriorates and switching of the main unit is required occurs, an aerial vehicle suited to being operated in main unit mode is set to be the main unit immediately from the viewpoint of communication quality, without performing buffering such as that described above, If, for instance, an aerial vehicle that satisfies the communication quality required to be a main unit does not exist, the main unit performs a process of transmitting only specific data from among data to be transmitted to server device 20. That is, the setting method for main unit mode/auxiliary unit mode in a monitored airspace is a third setting method of not modifying the operating mode of first aerial vehicle 10, if first aerial vehicle 10 operating in main unit mode from among a plurality of aerial vehicles 10 is not suited to being operated in main unit mode, and second aerial vehicle 10 is not suited to being operated in main unit mode.

Accordingly, the attributes of an airspace include an attribute determined in accordance with the degree of importance pertaining to the process of transmitting data from aerial vehicle 10 to a server device 20 (first attribute) and/or an attribute determined in accordance with the extent to which processes pertaining to communication are distributed among a plurality of aerial vehicles 10 (second attribute). Setting unit 23 sets the operating mode of an aerial vehicle to the aforementioned main unit mode or auxiliary unit mode. Here, setting unit 23 sets the operating modes of each of a plurality of aerial vehicles using a setting method corresponding to the attributes of an airspace in which the plurality of aerial vehicles fly, from among a plurality of setting methods that set the operating mode of an aerial vehicle.

Processing unit 24 performs some kind of process using data generated in aerial vehicle 10 and acquired by data acquisition unit 21 (imaging data and/or sensing data). This process includes accumulation, processing, editing, analyzing, outputting, and the like of data.

Operation

The following is an explanation of the operation of server device 20. In the following explanation, if server device 20 is disclosed as the main body of processing, specifically, processor 2001 performs an operation by having hardware such as processor 2001 and memory 2002 read a predetermined software (program), and processing is executed by controlling communication by communication device 2004 and/or reading and/or writing of data from/to memory 2002 and storage 2003. The same applies to aerial vehicle 10.

Figure 5:
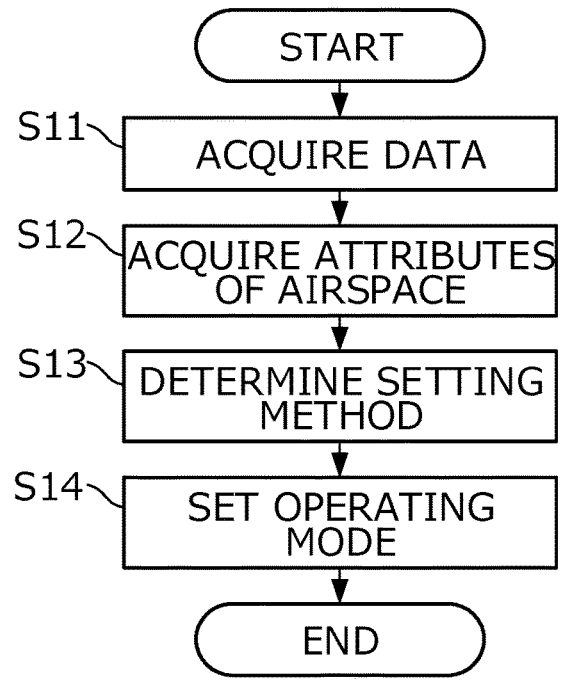
FIG. 5 is a flow chart illustrating one example of the operation of a server device in accordance with the present invention.

In FIG. 5, the aerial vehicle 10 that is initially set to be the main unit is determined in advance, and this main unit receives, from an auxiliary unit via second wireless communication unit 12, identification information of an auxiliary unit, information indicating flight status including the position (including latitude, longitude, and altitude), flight direction, and flight speed of the auxiliary unit, and information indicating data generated in the auxiliary unit (imaging data and/or sensing data described above) and/or the communication quality and/or remaining battery power of first wireless communication unit 11 in the auxiliary unit. The main unit transmits information acquired from the auxiliary unit from first wireless communication unit 11 to server device 20, in addition to identification information of the host aerial vehicle, information indicating the flight status, including the position (including latitude, longitude, and altitude), flight direction, and flight speed of the host aerial vehicle, and information indicating data generated in the host aerial vehicle (the abovementioned imaging data or sensing data), and communication quality and/or remaining battery power of first wireless communication unit 11 in the host aerial vehicle. In FIG. 5, data acquisition unit 21 of server device 20 acquires data transmitted from first wireless communication unit 11 of aerial vehicle 10, which is the main unit (step S11).

In server device 20, attribute acquisition unit 22 acquires the attributes of an airspace in which a plurality of aerial vehicles 10 fly, from a database or the like in which the positions and attributes of airspaces are associated with one another, on the basis of each of the positions of the aerial vehicles 10 included in data acquired by data acquisition unit 21 (step S12).

In server device 20, setting unit 23 sets a setting method corresponding to the attributes of an acquired airspace from among a plurality of setting methods for setting the operating mode of an aerial vehicle (step S13). At this time, the relationship between the attributes and setting method of an airspace is as described above.

In server device 20, setting unit 23 sets the operating mode for each of a plurality of aerial vehicles 10 on the basis of the determined setting method (step S14). That is, setting unit 23 notifies aerial vehicle 10, which transmitted data in step S11, of the identification information of aerial vehicle 10 that is to be the main unit and the identification information of aerial vehicle 10 that is to be an auxiliary unit. Aerial vehicle 10 that has received this notification notifies aerial vehicle 10 with identification information specified as the main unit that the aerial vehicle is to be operated in main unit mode, and notifies aerial vehicle 10 with identification information specified as the auxiliary unit that the aerial vehicle is to be operated in auxiliary unit mode. If no switching of main unit occurs, the aerial vehicle 10 that has received the notification continues to operate in main unit mode.

Such processing is executed periodically, at a timing at which a request is issued from aerial vehicle 10, or at a timing at which a request is issued from server device 20. Meanwhile, processing unit 24 of server device 20 performs a process using data generated in aerial vehicle 10 and acquired by data acquisition unit 21 (imaging data and/or sensing data).

According to the present embodiment described above, the operating mode of each aerial vehicle 10 can be suitably controlled in accordance with the attributes of an airspace when any of a plurality of aerial vehicles 10 collects data from another aerial vehicle 10 and transmits the data.

Modified Examples

The present invention is not limited to the above-described embodiment. The above-described embodiment may be modified as follows. Moreover, two or more of the following modified examples may be combined.

Modified Example 1

The control device that performs control of switching the main unit may be mounted on server device 20 as exemplified in the embodiment, or may be mounted on each of aerial vehicles 10. If the control device is mounted on each of aerial vehicles 10, the aerial vehicle 10 that is operating in main unit mode performs the switching control of the control device. Moreover, the functions of the control device pertaining to the present invention may be provided by being distributed among a plurality of devices.

Modified Example 2

A configuration may be adopted, wherein, data to be transmitted to server device 20 is collected by second aerial vehicle 10 from other aerial vehicles 10 (including first aerial vehicle 10) before the main unit is switched from first aerial vehicle 10 to second aerial vehicle 10, and when the main unit is switched from first aerial vehicle 10 to second aerial vehicle 10, second aerial vehicle 10 transmits, to server device 20, data collected from other aerial vehicles 10 (including the first aerial vehicle). In this case, second aerial vehicle 10 is operating in the third operating mode (referred to as before-switching data reception mode) from when data collection from other aerial vehicles 10 (including the first aerial vehicle) begins until the main unit is switched from first aerial vehicle 10 to second aerial vehicle 10. Specifically, setting unit 23 sets one or more aerial vehicles 10 from among second aerial vehicles 10 operating in auxiliary unit mode to before-switching data reception mode that receives data from other aerial vehicles 10 via second wireless communication unit 12, at a timing that is a given period prior to a period in which first aerial vehicle 10 operating in main unit mode is set to auxiliary unit mode, by issuing a command to each aerial vehicle 10. At the time at which first aerial vehicle 10 operating in main unit mode is to be set to auxiliary unit mode, setting unit 23 sets first aerial vehicle operating in main unit mode to auxiliary unit mode, and sets second aerial vehicle 10 operating in before-switching data reception mode to main unit mode.

Modified Example 3

A configuration may be adopted, wherein a group of all aerial vehicles 10 temporarily store data to be transmitted to the main unit or server device 20 before the main unit is switched from first aerial vehicle 10 to second aerial vehicle 10, and when the main unit is switched from first aerial vehicle 10 to second aerial vehicle 10, the data temporarily stored by the group of aerial vehicles is transmitted to second aerial vehicle 10. In this case, the group of aerial vehicles is operating in a fourth operating mode (referred to as before-switching data buffer mode) from when temporary storage of data to be transmitted to the main unit or server device 20 begins until the main unit is switched from first aerial vehicle 10 to second aerial vehicle 10. Specifically, before first aerial vehicle 10 operating in main unit mode is set to auxiliary unit mode, setting unit 23 sets each aerial vehicle 10 to before-switching data buffer mode that temporarily stores data generated in host aerial vehicle 10, sets first aerial vehicle 10 operating in main unit mode to auxiliary unit mode, sets one or more second aerial vehicle 10 operating in before-switching data buffer mode to main unit mode, and sets other second aerial vehicles 10 operating in before-switching data buffer mode to auxiliary unit mode.

The block diagram used to explain the above-described embodiment illustrates functional unit blocks. These functional blocks (components) are realized by arbitrarily combining hardware and/or software. The method for realizing each functional block is not particularly limited. That is, each functional block may be realized using one device that is physically and/or logically bound, or may be realized by using two or more devices, which are physically or logically separated, being directly or indirectly (for example, via a wire, wirelessly etc.) connected. The functional blocks may be realized by combining software in the abovementioned one device or plurality of devices.

The functions include, but are not limited to, judging, determining, calculating, estimating, processing, deriving, investigating, searching, confirming, receiving, transmitting, outputting, accessing, solving, selecting, electing, establishing, comparing, estimating, expecting, regarding, broadcasting, notifying, communicating, forwarding, configuring, reconfiguring, allocating, mapping, assigning, and the like.

For example, a functional block (functional unit) that executes the transmission function is referred to as a transmitting unit and/or a transmitter. As described above, the realization methods thereof are not particularly limited.

For example, the server device and the like in one embodiment of the present disclosure may function as a computer that performs the process of the present disclosure.

Each mode/embodiment explained in the present disclosure may be applied to one or more of long term evolution (LTE), LTE-advanced (LTE-A), SUPER 3G, IMT-advanced, fourth generation mobile communication system (4G), fifth generation mobile communication system (5G), future radio access (FRA), new radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), other systems that use suitable systems, and next-generation systems expanded on the basis of the aforementioned systems. Moreover, a plurality of systems may be combined (for example, combining LTE and/or LTE-A with 5G, etc.) and applied.

The order of the process steps, sequences, flowcharts, and the like of each mode/embodiment explained in the present disclosure may be interchanged, provided no specific order exists. For example, the methods explained in the present disclosure present elements of various steps using the orders thereof as examples, and the orders are not limited to the specific orders presented.

Inputted/outputted information and the like may be stored in a specific location (for example, a memory), or may be managed using a management table. Information and the like to be input/output may be overwritten, updated, or postscripted. Outputted information and the like may be deleted. Inputted information and the like may be transmitted to another device.

Determination may be performed using a value (0 or 1) represented by one bit, may be performed using Boolean (true or false), or may be performed using comparison of numerical values (for example, comparison with a predetermined value).

Each embodiment/modified example explained in the present disclosure may be used singularly or combined, or switched according to the execution thereof. Moreover, notification of predetermined information (for example, notifying "of being X") is not limited to being performed explicitly, and may be performed implicitly (for example, not notifying the predetermined information).

Above is a detailed explanation of the present disclosure, but it would be obvious to a person skilled in the art that the present disclosure is not limited to the embodiment explained in the present disclosure. The present disclosure may be embodied as corrected and modified modes without deviating from the purpose and scope of the present disclosure defined by the disclosure in the claims. Accordingly, the disclosure in the present invention aims to explain examples, and does not have a limited significance with respect to the present invention.

Software as used herein means software, firmware, middleware, microcode, or hardware description language, and may be widely interpreted as a command, command set, code, code segment, program code, program, sub-program, software module, application, software application, software package, routine, sub-routine, object, executable file, execution thread, order, function, or the like, regardless of whether another term is used. Software, instructions, information, and the like may be transmitted/received via a transmission medium. If, for example, software is transmitted from a website, a server or another remote source using wired technology (coaxial cable, optical fiber cable, twisted pair wire, digital subscriber line (DSL) or the like) and/or wireless technology (infrared rays, microwaves, or the like), the wired technology and/or wireless technology are included in the definition of a transmission medium.

Information, signals and the like in the present disclosure may be referred to in various ways. For example, as data, instructions, commands, information, signals, bits, symbols, chips, and the like, may be used across the entire explanation above, and may be represented as voltages, currents, magnetic waves, magnetic fields or magnetic particles, optical fields or protons, or by any combination thereof.

The terms explained in the present disclosure and terms required to understand the present disclosure may be replaced with terms having the same or similar meanings.

Information, parameters or the like in the present disclosure may be represented using absolute values, may be represented using relative values obtained from predetermined values, or may be represented using other corresponding information.

The wording "on the basis of" used in the present disclosure does not signify "only on the basis of", unless otherwise specified. That is to say, the wording "on the basis of" signifies both "only on the basis of" and "on the basis of at least".

The overall amount or order of various references to elements referred to as "the first", "the second" and the like in the present disclosure are not limited thereto. These references may be used in the present disclosure as methods that are useful for differentiating between two or more elements. Accordingly, references to the first and second elements do not signify that only the two elements may be adopted, or that the first element must precede the second element in some form.

The term "unit" in the configuration of each device described above may be replaced with the terms "means", "circuit", "device", or the like.

As long as the terms "include", "including" and modifications thereof are used within the present disclosure, the intention of these terms are comprehensive, similarly to the term "comprising". Moreover, the intention for the term "or" used in the present disclosure is not an exclusive or.

In the present disclosure, if, for example, an article such as "a", "an", or "the" is used, the subsequent noun may be singular or plural.

In the present disclosure, the wording "A and B differ" may signify that "A and B differ from each other". This wording may also signify that "A and B each differ from C". The terms "separated", "connected", and the like may also be interpreted in a similar manner to the term "differs".

REFERENCE NUMERALS

1: flight control system
10, 10a, 10b, 10c: aerial vehicle
11, 11a, 11b, 11c: first wireless communication unit
12, 12a, 12b, 12c: second wireless communication unit
1001: processor
1002: memory
1003: storage
1004: first wireless communication device
1005: second wireless communication device
1006: input device
1007: output device
1008: flight device
1009: positioning device
20: server device
21: data acquisition unit
22: attribute acquisition unit
23: setting unit
24: processing unit
2001: processor
2002: memory
2003: storage
2004: communication device
2005: input device
2006: output device.

What is claimed is:

1. A control device comprising:
a setting unit configured to set an operating mode of an aerial vehicle to a first operating mode or a second operating mode, the aerial vehicle comprising a first wireless communication unit configured to perform wireless communication via a communication network and a second wireless communication unit configured to perform wireless communication without use of the communication network, the first operating mode being an operating mode in which the aerial vehicle sends data generated in the aerial vehicle and data received from another aerial vehicle by use of the second wireless communication unit to a data processing device by use of the first wireless communication unit, the second operating mode being an operating mode in which the aerial vehicle sends, by use of the second wireless communication unit, data generated in the aerial vehicle to another aerial vehicle that is operating in the first operating mode; and
attribute acquisition unit configured to acquire attributes of each of airspaces, wherein the setting unit is configured to set each of operating modes of aerial vehicles to the first operating mode or the second operating mode in accordance with one of setting methods that corresponds to an attribute of an airspace in which the aerial vehicles are flying.

2. The control device according to claim 1, wherein the attributes are classified in accordance with an importance of a process in which an aerial vehicle sends data to the processing device.

3. The control device according to claim 1, wherein the attributes are classified in accordance with an extent of distribution of communication-related processing among aerial vehicles.

4. The control device according to claim 1, wherein:
the attributes comprise a first attribute and a second attribute;
a process of sending data to the processing device is important and an extent of distribution of processing among aerial vehicles is smaller in an airspace having the first attribute than that in an airspace having the second attribute;
the setting unit is configured to set, in the airspace having the first attribute, each of operating modes of aerial vehicles in accordance with a setting method whereby one of the aerial vehicles sends data to the processing device earlier than in the airspace having the second attribute; and
the setting unit is configured to set, in the airspace having the second attribute, each of operating modes of aerial vehicles in accordance with a setting method whereby an extent of distribution of processing among the aerial vehicles in the airspace having the second attribute is larger than that in the airspace having the first attribute.

5. The control device according to claim 1, wherein the setting methods comprise:
a first setting method whereby an aerial vehicle operating in the first operating mode is not caused to change its operating mode regardless of whether the aerial vehicle is suited to operating in the first operating mode;
a second setting method whereby before an aerial vehicle operating in the first operating mode is caused to change its operating mode to the second operating mode, a determination is made whether the aerial vehicle is suited to operating in the first operating mode within a predetermined time period, and the aerial vehicle is caused to change its operating mode based on the determination; and
a third setting method whereby when a first aerial vehicle of aerial vehicles, operating in the first operating mode, is not suited to operating in the first operating mode, and a second aerial vehicle of the aerial vehicles is not suited to operating in the first operating mode, the first aerial vehicle is not caused to change its operating mode.

6. The control device according to claim 1, wherein the airspaces comprise airspaces that differ spatially or airspaces that are spatially identical and differ temporally.

7. A non-transitory computer readable storage medium that stores a program for causing a computer to function as:
an attribute acquisition unit configured to acquire attributes of each of airspaces; and
a setting unit configured to set an operating mode of an aerial vehicle to a first operating mode or a second operating mode, the aerial vehicle comprising a first wireless communication unit configured to perform wireless communication via a communication network and a second wireless communication unit configured to perform wireless communication without use of the communication network, the first operating mode being an operating mode in which the aerial vehicle sends data generated in the aerial vehicle and data received from another aerial vehicle by use of the second wireless communication unit to a data processing device by use of the first wireless communication unit, the second operating mode being an operating mode in which the aerial vehicle sends, by use of the second wireless communication unit, data generated in the aerial vehicle to another aerial vehicle that is operating in the first operating mode, wherein the setting unit is configured to set each of operating modes of aerial vehicles to the first operating mode or the second operating mode in accordance with one of setting methods that corresponds to an attribute of an airspace in which the aerial vehicles are flying.

8. A control method comprising:
acquiring attributes of each of airspaces; and
setting each of operating modes of aerial vehicles to a first operating mode or a second operating mode in accordance with a setting method that corresponds to an attribute of an airspace in which the aerial vehicles are flying, wherein:
each of the aerial vehicles comprises a first wireless communication unit configured to perform wireless communication via a communication network and a second wireless communication unit configured to perform wireless communication without use of the communication network;
the first operating mode is an operating mode in which an aerial vehicle sends data generated in the aerial vehicle and data received from another aerial vehicle by use of a second wireless communication unit of the aerial vehicle to a data processing device by use of a first wireless communication unit of the aerial vehicle; and
the second operating mode is an operating mode in which an aerial vehicle sends, by use of a second wireless communication unit of the aerial vehicle, data generated in the aerial vehicle to another aerial vehicle that is operating in the first operating mode.

* * * * *